United States Patent

Kim et al.

[11] Patent Number: 5,382,651
[45] Date of Patent: Jan. 17, 1995

[54] METHOD FOR THE PREPARATION OF POLYESTER FOR A FILM

[75] Inventors: Kwang T. Kim; Tae H. Kim; Seung B. Jun, all of Kyungsan, Rep. of Korea

[73] Assignee: Cheil Synthetics, Inc., Kyungsan, Rep. of Korea

[21] Appl. No.: 107,067

[22] Filed: Aug. 17, 1993

[30] Foreign Application Priority Data

Sep. 3, 1992 [KR] Rep. of Korea ............... 1992-16045

[51] Int. Cl.$^6$ ............................................. C08G 63/78
[52] U.S. Cl. ................................. 528/283; 528/272; 528/275; 524/730; 210/660
[58] Field of Search ................. 528/272, 275, 283; 524/730; 210/660

[56] References Cited

U.S. PATENT DOCUMENTS

| | | | |
|---|---|---|---|
| Re. 32,741 | 8/1988 | Miyoshi et al. | 528/295 |
| 4,254,182 | 3/1981 | Yamaguchi et al. | 428/372 |
| 4,526,738 | 7/1985 | Miyoshi et al. | 264/176 |
| 4,866,012 | 9/1989 | Silverman | 501/90 |

*Primary Examiner*—Samuel A. Acquah
*Attorney, Agent, or Firm*—Nikaido, Marmelstein, Murray & Oram

[57] ABSTRACT

A method for the production of polyester suitable to be molded into a film with excellent surface properties.

The method comprises passing dispersion-in-water type silica sol with pH 8 to 11 including sodium oxide as a stabilizer and silica particles with average diameters 0.01 to 0.3 μm through a column of cation exchange resin having the following formula 1 and the strong basic anion exchange having the following formula 2, in sequence to adjust the pH value to 2 to 4, adding an hydrogen bonding agent and ethylene glycol thereto, heating the resultant silica sol under a reduced pressure to remove water, so as to obtain dispersion-in-ethylene glycol type silica sol, and adding 0.01 to 5% by weight of the dispersion-in-ethylene glycol type silica sol, as based on the weight of polyester to be produced, at any step during the ester interchange reaction.

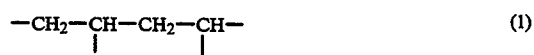

(1)

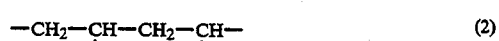

(2)

5 Claims, No Drawings

METHOD FOR THE PREPARATION OF POLYESTER FOR A FILM

BACKGROUND OF THE INVENTION

1. Field of the Invention

The present invention relates in general to a method for the production of polyester for a film with excellent surface properties, and more particularly to a method for the production of polyester including silica particles therein which are capable of allowing a film molded of the polyester to have excellent surface properties such as slip property and abrasion resistance. The present invention also relates to a method for the production of dispersion-in-ethylene glycol type silica sol capable of being dispersed evenly well in a polyester film.

2. Description of the Prior Art

As well known to those skilled in the art, polyester, of which polyethylene terephthalate is representative, has excellent intrinsic physical and chemical properties, and is capable of being formed into a film, which has been recently used for various purposes, for example, for a magnetic tape, a graphic art film, a condenser film, a package film and the like.

However, in spite of its excellent intrinsic properties, the film which is molded of polyethylene terephthalate, a representative of polyester, has a large coefficient of friction and is liable to generate static electricity, so that there may occur many problems in a series of the processes for molding polyethylene terephthalate into a film, for example, a magnetic tape, such as a process of forming a film therewith, a process of coating the film with a magnetic material and the like.

For example, in a process for the production of a film, friction occur between the film and the roll through which the film is passed in the process. In accordance with the occurrence of the friction, there also occurs abrasion on the film. Meanwhile, the friction and the abrasion are dependent on the slip property and the abrasion resistance of the film, respectively. That is, the slip property and the abrasion resistance of the film are the properties that resist the friction and the abrasion. Therefore, the film having the poor slip property and abrasion resistance does not resist the friction and abrasion, effectively, so that scratches are generated on the film. In addition, the friction and the abrasion allow a quantity of white powder to occur on the film surface. As a result, the poor slip property and abrasion resistance of a film detrimentally affects the quality of final products made of the film. Accordingly, the slip property and abrasion resistance of a film is one of the most important factors that determine the quality of the film and the film-made product.

Particularly, in the event of using a polyester film as a material for a magnetic tape, which is formed, for example, by applying a magnetic layer to the polyester film surface, when the magnetic tape is running in a recording/playback apparatus in order to record magnetic signals thereon or to play back the magnetic signals recorded thereon, the tape comes into long contact with a head drum and a guide roll in the apparatus. Therefore, scratches and white powders are more likely to occur on the surface of the magnetic tape due to the long contact. Subsequently, the scratches and the white powders detrimentally affect the magnetic tape such as to generate the drop out of magnetic signals. In addition, if the magnetic tape is used repeatedly many times and for a long time, coefficient of friction is increased, so that the traveling ability of the magnetic tape becomes deteriorated.

In an effort for solving the above-mentioned problems, there is generally used a method for the production of polyester which seeks to reduce the contact areas between the films themselves made of polyester and between the film and the roll by applying on the surface of the film protrusions, which improve the slip property and the abrasion resistance of the film.

Prior arts have sought ways of applying the protrusions on a film surface and thus, improving the film surface properties in a satisfactory manner.

For example, a method of forming inner particles is disclosed in Japanese Patent Publication No. Sho. 52-32914 wherein inactivated fine particles are deposited from catalyst residues during the production of polyester.

Another example is a method of casting outer particles that is disclosed in Japanese Patent Publication No. Sho. 56-19263 wherein inactivated fine particles are added during the production of polyester.

In the method of forming inner particles, there are such advantages that it is not necessary to pulverize and grade the particles, the deposited particles have a good affinity for the film, and the particles has excellent abrasion resistance due to their low hardness. This method, however, has difficulty in controlling the diameter of the deposited particles, and there occur differences among the batches which are made by the method.

The method of casting film with outer particles, in which inactivated inorganic particles such as calcium carbonate, barium sulfate, calcium sulfate, kaolin, silica, talc, titanium dioxide and the like are added with polyester is synthesized or polyester is molded into a film, is advantageous in the fact that it is possible to freely select the amount and the diameter of particles, and to stabilize the conditions of particles and the properties of polymer even when operating for long time. However, in dependence on the kind and the size of the particles, macro granules are formed by aggregation of the particles, so that there occur disadvantages such as, for example, drop out and the like when the film is used, for example, as a magnetic tape.

In general, the more particles are included in polyester, the better is the slip property of the film made of the polyester. However, the particles with large diameters which are included in polyester film in order to improve the slip property thereof may lower the quality of the final product made of the polyester film, such as a video tape, an audio tape and the like, causing the product used in such a precision field as an electromagnetic field to be deteriorated in electromagnetic transit property.

Recently, an electromagnetic recording medium has been required to have a larger capacity in a smaller size or to be compact. Thus, according to the requirement, the components for recording electromagnetic signals are necessary to be highly dense in a film for the electromagnetic recording medium. Subsequently, this causes the particles which are added to or deposited from the film to become finer.

However, more fine particles have a strong tendency to aggregate to one another because attraction among the fine particles becomes stronger, so that the number of macro granules which result from the aggregation of the fine particles becomes increased on a film. Thus, it is demanded to disperse the fine particles evenly on the film to prevent the particles from the aggregating one another.

For example, for the purpose of improving the slip property of the film molded of polyester, silica which is an inorganic particle, is added during synthesizing polyester. However, the silica has a strong tendency to aggregate in the polyester film. As a result, there are formed macro granules, and their number is increased more and more in the polyester film.

In this case, in order to prevent macro granules from occurring, such various methods as can disperse the silica particles evenly are disclosed. For example, in Japanese Patent Publication No. Sho. 57-44623, disclosed is a method in which silanol groups of the silica particle are blocked to improve the dispersibility of the silica particles. Another method is disclosed in Japanese Patent Laid-Open No. Sho. 63-221158 in which monodispersive silica particle spheres that result from the hydrolysis of an organometallic compound, for example, ethylorthosilicate, are added during the synthesis of polyester.

The above-mentioned methods are capable of obtaining protrusions on the film which are uniform to some degree. It, however, is known that during the polymerization of polyester, there occur hydroxy groups on the surfaces of silica particles, which are one of the factors that attract the particles one another, so that when the polyester is molded into a film, macro granules are formed on the surfaces of the polyester film.

SUMMARY OF THE INVENTION

For solving the above-mentioned problems, the present inventors have recognized that there exists a need for a method for the production of polyester suitable to be molded to a film with excellent surface properties by applying silica particles with an excellent dispersibility in the film.

Accordingly, in one aspect of the present invention, there is provided a method for the production of a dispersion-in-ethylene glycol of silica sol which is capable of being evenly well dispersed in a polyester film.

According to another aspect of the present invention, there is provided a method for the production of a polyester which comprises the addition thereto of silica particles with excellent dispersibility.

The film which is molded of the polyester produced by the method according to the present invention, has evenly well dispersed protrusions of silica, which allow the film to have excellent surface property, such as slip property and abrasion resistance.

In accordance with the present invention, the dispersion-in-ethylene glycol type silica sol is prepared by passing dispersion-in-water type silica sol of pH 8 to 11 which includes sodium oxide as a stabilizer and silica particle with average diameter of 0.01 to 0.3 μm through a column of ion exchange resins to adjust the pH of the silica sol to 2 to 4, adding a hydrogen bonding agent and ethylene glycol to the silica sol and heating the silica sol under a reduced pressure to remove water in the silica sol.

In accordance with the present invention, the method for the production of polyester comprises the addition of the silica sol dispersed in ethylene glycol at any step during ester interchange reaction in the production of polyester.

The silica particles are commercially available in two types which are largely divided into a type of dried powder and a type of dispersion-in-water. The dried powder type silica particles, when dried, had been already aggregated due to siloxane bonds occurring on the surface thereof, so that it is difficult for the silica particles to be dispersed again. In the dispersion-in-water type, the primary particles of silica are stably dispersed in water to form a sol, so that the silica particles are easy to store for a long time. Particularly, these silica particles may be used for the production of polyester which is to be molded into a film.

In processes for the production of dispersion-in-water type silica, sodium silicate, and ethylsilicate or silicontetrachloride are may be used as starting materials. The process, when sodium silicate is used as a starting material, is commercially advantageous in the fact that the price of sodium silicate is lower than that of the others.

The dispersion-in-water type silica which is produced by the process using sodium silicate as a starting material is generally provided in such a state that ammonia or sodium oxide is added as a stabilizer for stabilizing the state of dispersion-in-water. Thus, due to the stabilizer, the pH value of the dispersion-in-water type silica is above 8. If the dispersion-in-water type silica is directly added during polymerization of polyester, an excess of water contained in the silica delays the polymerization progress. Therefore, it is necessary to substitute the water with ethylene glycol.

However, when ethylene glycol is simply added to substitute the water in the dispersion-in-water type silica and then the water is removed, it is found that the silica particles is congregated, so as to precipitate in large quantities, and the dispersion-in-ethylene glycol type silica that thus is obtained, is not applicable to polyester for film.

Accordingly, it is necessary to develop a novel method for substitution of ethylene glycol for water in the dispersion-in-water type silica without congregating and precipitating silica particles, which is developed by the present inventors, at last.

These and other objects and advantages of the present invention will be more apparent as following description proceeds.

DETAILED DESCRIPTION OF THE INVENTION

Generally, polyester may be prepared by a conventional method using an ester interchange reaction between dicarboxylic acid ester component and glycol component or a reaction between a dicarboxylic acid and a glycol. The dicarboxylic acid component may be comprised of, for example, 80 to 100 mol % of terephthalic acid for ester-forming derivatives thereof and 0 to 20 mol % of one selected from a group consisting of 2,6-naphthalenedicarboxylic acid, isophthalic acid, diphenylcarboxylic acid, diphenylmethanecarboxylic acid, diphenylethercarboxylic acid, diphenylsulfondicarboxylic acid, anthracenedicarboxylic acid and ester-forming derivatives thereof. The glycol component may be comprised of, for example, 80 to 100 mol % of ethylene glycol and 0 to 20 mol % of one selected from a group consisting of alkylene glycol having 2 to 10 carbon atoms, such as trimethylene glycol, tetramethylene glycol, pentamethylene glycol, hexamthylene glycol, decamethylene glycol and etc. and alicyclic compound such as cyclohexanedimethanol.

In an embodiment of the present invention, polyester is produced by the method which comprises passing dispersion-in-water type silica sol with pH 8 to 11 including sodium oxide as a stabilizer and silica particles with average diameters 0.01 to 0.3 μm through a column of cation exchange resin, passing the resultant silica sol again through a column of strong basic anion exchange resin to adjust pH value thereof to 2 to 4, adding an hydrogen bonding agent and ethylene glycol thereto, heating the resultant silica sol under a reduced pressure to remove water, so as to obtain dispersion of silica sol in ethylene glycol type silica sol, and adding 0.01 to 5% by weight of the dispersion-in-ethylene glycol type silica sol, as based on the weight of polyester to be produced, at any step during the ester interchange or direct esterification reaction.

In another embodiment in accordance with the present invention, there is provided a biaxially stretched polyester film which is molded of the polyester produced by the above method.

The average diameter of the silica particles which are contained in the dispersion-in-water type silica sol used in the present invention is preferably on the order of about 0.01 to 0.3 μm. For example, if the diameter is below 0.01 μm, the produced polyester film has low slip property, so that the productivity for producing polyester film becomes decreased. On the other hand, if the diameter is above 0.3 μm, the roughness of the film becomes increased, so that the final products made of the polyester film come to be of poor qualities.

The silica content of the dispersion-in-water type silica sol is preferably on the order of about 10 to 50% by weight. For example, too small content of the silica is disadvantageous because that there is an excess of water to be removed by the substitution with ethylene glycol. On the other hand, if too large the content is, the silica particles aggregates during the substitution, so that macro granules are formed on the polyester film.

In addition, the dispersion-in-water type silica sol used in the invention has preferably 8 to 11 of pH value. For example, if the value is below 8, the dispersibility of the silica particles becomes unstable, so that it is difficult in storing the dispersion-in-water type silica sol a for long time, whereas if above 11, the silica particles become dissolved in water.

Generally, as a stabilizer for the dispersion-in-water type silica sol, sodium ion or ammonium ion is added. The stabilizer ions allow the surface of the silica particle to be charged with negative ion, which repulses one another, so that the dispersion-in-water type silica sol becomes stabilized. According to the present invention, sodium oxide as a source of the sodium ion is preferably on the order of about 0.1 to 1.0% by weight, as based on the total weight of the dispersion-in-water type silica sol.

However, sodium ion not only stabilizes the dispersion-in-water type silica sol, as described above, but also contributes to the gel formation or precipitation of the silica particles. It is, thus, necessary to remove the sodium cation from the surface of the silica particles which are in the colloidal phase in order to prevent the gel formation or precipitation of the particles.

Therefore, in accordance with the present invention, for the purpose of removing the cation from the surface, the dispersion-in-water type silica sol is passed through a cation exchange resin of the following formula 1 and a strong basic anion exchange resin of the following formula 2, in sequence.

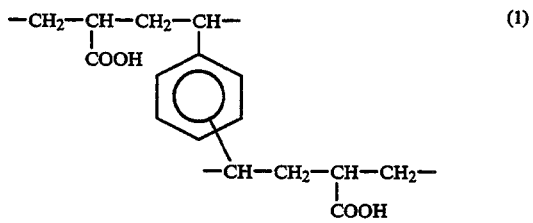

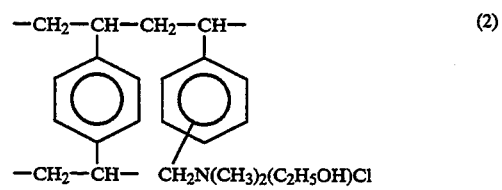

The passed dispersion-in-water silica sol, from which the cations are removed, has preferably pH values of 2 to 4.

In the step of substituting ethylene glycol for water in dispersion-in-water type silica sol, since water was removed completely from the silica sol and until the silica particle has been esterified with ethylene glycol enough to become stable, the silica particle is vulnerable to aggregation and precipitation. During this period, that is, from time of removal of water protection layer for the particle to the time of just before formation of ethylene glycol protection layer, the naked particle must be protected by another protection layer.

In accordance with the present invention, as the protection layer, a hydrogen bonding layer is provided to the naked particle. The hydrogen bonding agent used in the present invention plays a role of forming a strong protection layer on the silica particle which is passed through the ion exchange resins according to the present invention. In detail, the hydrogen bonding layer protects the silica particle which is not charged with ions as well as prevents the silica particles from aggregating and precipitating. For example, if there is no the protection layer according to the present invention, siloxane bonds are formed among particles and furthermore, condensation reaction of silanol groups proceeds, so that macro granules are formed on the polyester film finally. In addition, the hydrogen bonding layers of the particles prevent collision therebetween, which is a factor in gel formation or precipitation.

The hydrogen bonding agent used in the present invention may be selected from a group consisting of dimethylformamide, tetramethylenesulfone, dimethylacetamide, N-acetylmorpholine, γ-butyrolactone, propylcarbonate, nitromethane and cyclopentanone. Dimethylformamide is more preferably selected.

The hydrogen bonding agent may be directly added to the dispersion-in-water type silica sol or may be added in combination with ethylene glycol.

When dispersion-in-water type silica sol is changed to dispersion-in-ethylene glycol type silica sol by substitution of water with ethylene glycol, the reaction system, consisting of dispersion-in-water type silica sol, the hydrogen bonding agent and ethylene glycol, must be kept vacuum. The pressure of the reaction system is preferably on the order of 2 to 150 mmHg, more preferably 5 to 100 mmHg and most preferably 5 to 20 mmHg.

While the water is substituted with ethylene glycol under vacuum, a reactive tube containing the reaction system is heated. Under vacuum, the temperature which is necessary for removing water completely from the dispersion-in-water type silica sol is preferably in the range of 25° to 100° C., more preferably 30° to 70° C. Although the time needed to remove the water completely varies in dependence on the conditions of vacuum and heating rate, it normally takes 1 to 10 hours. After removing the water completely, the pressure of the reaction system is adjusted to atmospheric pressure, and then, the temperature thereof is quickly increased to 197° C., which is the boiling point of ethylene glycol. Next, the reaction system is refluxed for 3 hours. During the reflux, silanol groups on the surface of the silica particles are esterified with ethylene glycol, so that it is possible to obtain stable dispersion-in-ethylene glycol type silica sol.

The silica particle content of the dispersion-in-ethylene glycol is preferably on the order of 5 to 20% by weight. For example, if the content is below 5% by weight, it is necessary that an excess of ethylene glycol is added to be substituted for an excess of water. On the other hand, if the content is above 20% by weight, the silica particles aggregate during polyester polymerization, so that macro granules are formed.

In the process of synthesizing polyester, the dispersion-in-ethylene glycol type silica sol may be added whenever the process is before polycondensation and in ester interchange reaction. The dispersion-in-ethylene glycol type silica sol is preferably in amounts of about 0.01 to 5% by weight, as compared with polyester to be synthesized. For example, if too little the silica sol is used, it is of little effect. On the other hand, if too much the silica sol is used, there are lowered the physical properties of the final products which are made of the polyester.

The present invention is further illustrated with reference to the following examples, these being indicative, however, of but a few of the various changes and modifications in which the principle of this invention and improvement may be employed.

The properties and features of the silica particles, the polyester and the polyester film according to the present invention were measured as follows;

1. Intrinsic viscosity of polyester.

The intrinsic viscosity of the polyester was measured at 25° C. using orthochlorophenol.

2. Average diameter of silica particles.

The average diameter of the silica particles was measured by dipping a carrier grid covered with Parlodion film into dispersion-in-water type silica sol, drying the grid and observing the diameters of primary particles with a transmission electron microscope.

3. Dispersibility of silica particles.

The number of macro granules with diameters of above 5 $\mu$m was counted per surface area (mm$^2$) of the polyester film with a thickness of 15 $\mu$m, using an optical microscope. The dispersibility was graded under the following standards;

First Grade: 1-3 count(s)
Second Grade: 4-7 counts
Third Grade: 8-11 counts
Fourth Grade: over 11 counts 4. Surface Roughness of the polyester film.

The surface roughness of the polyester film was measured 5 times using a measuring meter for surface roughness (trademark SE-3H, manufactured by Kosaka Kenkusho, Japan) under the following condition. Center line surface roughness (Ra) was determined by averaging the values measured 5 times.

Radius of needle: 2 $\mu$m
Measured length: 1.0 mm
Measuring pressure: 45 mg
Cut-off value: 0.8 mm

EXAMPLE 1

1 kg of dispersion-in-water type silica sol having pH value of 9.0 at 25° C. which includes 50% by weight of silica particles with a specific surface area of 50 cm$^2$/g and an average particle diameter of 0.06 $\mu$m and 0.4% by weight of sodium oxide as a stabilizer was passed through the cation exchange resin of the above-mentioned structural formula 1 and the strong basic anion exchange of the above-mentioned structural formula 2, in sequence, to adjust the pH value to 2.7. The ion-exchanged silica sol was input to a reaction tube with a stirrer, a refining column and a condensation tube in combination with 4.5 kg of ethylene glycol and 5 g of dimethylformamide. Stirring the mixture under the condition of 40 mmHg and 57° C. for 3 hours, water was removed completely from the silica sol. The pressure and the temperature of the reaction tube were increased to the atmospheric pressure and 197° C., respectively. Then, the reaction system was refluxed for 4 hours to obtain dispersion-in-ethylene glycol type silica sol with a silica content of 10.5% by weight. The obtained silica sol was added to polymerization reactant in which the ester interchange reaction of dimethyl terephthalate and ethylene glycol had been finished in such an amount that the content of silica particles was 0.3% by weight as based on the dimethyl terephthalate. The resultant reactant was polycondensed under a reduced pressure to obtain polyethylene terephthalate which had an intrinsic viscosity of 0.63.

The polyethylene terephthalte was dried at 175° C. for 3 hours, and then, melted at 290° C. in an extruder. Through a slit die of the extruder, the melted polyethylene terephthalate was extruded into over a cooling drum which was rotating to obtain a sheet with a thickness of 200 $\mu$m. The stretched sheet was stretched to both vertical and horizontal directions in a draw ratio of 3.7, respectively. The stretched sheet was heated to 200° C. for 5 seconds to obtain a biaxially stretched polyester film with a thickness of 15 $\mu$m.

The obtained film was measured as stated above. The measured results are that center line surface roughness is 0.010 $\mu$m and the dispersibility is first grade.

From the results of the example, it is certain that the film prepared by the method according to the present invention has excellent surface properties such as slip property and abrasion resistance, so that the film may be used for manufacturing final products without scratches and white powders occurring thereon.

What is claimed is:

1. A method for the production of polyester having improved surface properties by a reaction comprising a polycondensation, comprising the steps of:
    contacting a dispersion-in-water type silica sol having a pH 8 of about to 11, including sodium oxide as a stabilizer and silica particles with average diameters of 0.01 to 0.3 $\mu$m, with a cation exchange resin having the following formula 1 and then with a strong basic anion exchange having the following formula 2, under conditions sufficient to adjust the pH value of the water dispersion to about 2 to 4;
    adding an hydrogen bonding agent and ethylene glycol to the pH adjusted water dispersion to form a mixture;

heating the resultant mixture under a reduced pressure under conditions sufficient to remove water and obtain silica sol dispersed in ethylene glycol; and adding 0.01 to 5% by weight of the silica sol dispersed in ethylene glycol, as based on the weight of polyester to be produced, to a reaction mixture comprising a dicarboxylic acid moiety and a glycol moiety reactive with said dicarboxylic acid moiety prior to said polycondensation

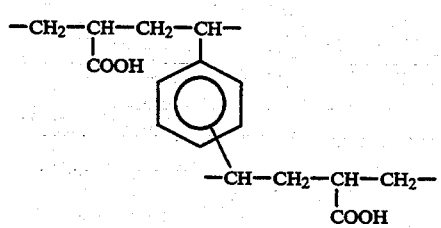 (1)

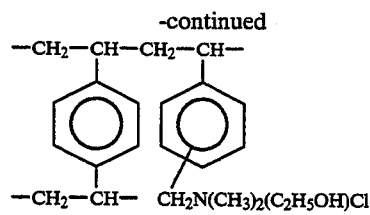 (2)

2. A method for the production of polyester of claim 1, in which the hydrogen bonding agent is selected from a group consisting of dimethylformamide, tetramethylenesulfone, dimethylacetamide, N-acetylmorpholine, gamma-butyrolactone, propylcarbonate, nitromethane and cyclopentanone.

3. A method for the production of polyester of claim 1, in which the water removal step is carried out at about 20° to 100° C. under a pressure of about 2 to 150 mmHg.

4. A method for the production of polyester of claim 1, in which the dispersion-in-ethylene glycol type silica sol has about 5 to 20% by weight of silica content.

5. A method as claimed in claim 1 wherein said dicarboxylic acid moiety comprises at least one or a dicarboxylic acid or an ester thereof.

* * * * *